(12) United States Patent
Nadjar et al.

(10) Patent No.: US 8,659,579 B2
(45) Date of Patent: Feb. 25, 2014

(54) METHOD AND APPARATUS FOR DETECTING HOLD CONDITION ON AN ACOUSTIC TOUCH SURFACE

(75) Inventors: Hamid Sheikhzadeh Nadjar, Waterloo (CA); Joe Henry Babb, Knoxville, TN (US); Robert L. Brennan, Kitchener (CA); Steven W. Haungs, Mountain View, CA (US); James R. Wynne, Jr., Kingston, TN (US); Joel C. Kent, Fremont, CA (US)

(73) Assignees: Elo Touch Solutions, Inc., Menlo Park, CA (US); Semiconductor Components Industries, LLC, Phoenix, AZ (US)

( * ) Notice: Subject to any disclaimer, the term of this patent is extended or adjusted under 35 U.S.C. 154(b) by 888 days.

(21) Appl. No.: 12/780,033

(22) Filed: May 14, 2010

(65) Prior Publication Data

US 2011/0025649 A1 Feb. 3, 2011

Related U.S. Application Data

(60) Provisional application No. 61/180,642, filed on May 22, 2009.

(51) Int. Cl.
*G06F 3/043* (2006.01)
(52) U.S. Cl.
USPC .......................................................... 345/177
(58) Field of Classification Search
USPC .......................................................... 345/177
See application file for complete search history.

(56) References Cited

U.S. PATENT DOCUMENTS

| 6,507,772 | B1 | 1/2003 | Gomes |
| 6,891,527 | B1 | 5/2005 | Chapman et al. |
| 7,345,677 | B2 | 3/2008 | Ing et al. |
| 7,411,581 | B2 | 8/2008 | Hardie-Bick |
| 7,683,890 | B2 | 3/2010 | Geaghan |
| 2006/0071912 | A1* | 4/2006 | Hill et al. ................ 345/173 |
| 2006/0279548 | A1* | 12/2006 | Geaghan ................ 345/173 |

FOREIGN PATENT DOCUMENTS

WO WO2009/007081 A1 1/2009

OTHER PUBLICATIONS

International Search Report and Written Opinion for International Application No. PCT/US2010/001431.

* cited by examiner

*Primary Examiner* — Latanya Bibbins
(74) *Attorney, Agent, or Firm* — Alston & Bird LLP

(57) ABSTRACT

A bending wave touch system includes at least one sensor and a touchscreen controller. The at least one sensor is coupled to a substrate and is responsive to vibrations in the substrate. The at least one sensor outputs signals. The controller receives the signals from the at least one sensor and identifies touch coordinates based on high frequency components of the signals when a touch on the substrate includes at least one of a tap, a drag and a lift-off. The controller identifies a status of a hold condition of the touch based on at least two different time averages of low frequency components of the signals.

20 Claims, 10 Drawing Sheets

METHOD AND APPARATUS FOR DETECTING HOLD CONDITION ON AN ACOUSTIC TOUCH SURFACE

CROSS REFERENCE TO RELATED APPLICATIONS

This application claims priority from U.S. provisional patent application No. 61/180,642 filed May 22, 2009, the content of which is hereby incorporated by reference.

BACKGROUND OF THE INVENTION

The subject matter disclosed herein relates generally to touch sensitive systems, and more particularly to determining whether a touch is being held on a bending wave touch panel of a touch sensitive system.

Touch panels are used to provide two-dimensional coordinate information. One example may be an opaque track pad while another example may be a transparent touchscreen placed in front of a display such as a liquid crystal display. Touch panels may be based on a variety of touch technologies including four-wire and five-wire resistive, capacitive, infrared and surface acoustic wave types, as well as bending wave touch technologies.

Bending waves may also be referred to as "flexural waves" as well as "lowest order anti-symmetric Lamb waves". Bending waves in a plate, such as a touchscreen substrate, are characterized by motion that is largely perpendicular to the surface and essentially the same at all depths with respect to the surface. Bending wave touch systems may use frequencies typically within the kilohertz (kHz) range.

For example, bending wave touch systems may detect a touch based on a tap of an object, such as a stylus or finger, used to excite bending waves in a substrate. The bending waves induce electrical signals in piezoelectric elements or sensors (piezos) bonded to the substrate. The electrical signals are captured by electronics and processed to determine (X,Y) coordinates of the touch position, such as by using time-of-flight methods to extract touch coordinate information from piezo signals. In other systems, an "acoustic fingerprint" may be determined based on the electrical signals and then compared with a library of acoustic fingerprints or templates having known (X,Y) coordinates to identify the best matching template. Acoustic fingerprints may be constructed as frequency profiles of signal amplitudes, signal amplitude ratios, signal phases, and/or phase differences between signals. Phase difference profiles have been found to be particularly useful acoustic fingerprints. Other bending wave systems may use other methods to identify the (X,Y) coordinates. Elo TouchSystems, a business unit of Tyco Electronics, offers acoustic fingerprint based bending-wave touch systems under the trade name "APR" or "Acoustic Pulse Recognition".

None of the conventional bending wave touch systems, however, can identify a hold condition, wherein the user has touched the touchscreen and is holding the finger or other object at the same (X,Y) coordinate location. Unless the user is tapping, dragging or otherwise moving the finger on the surface, bending wave signals in the kilohertz range are not generated and the system does not know that the finger is present on the surface. During a hold, the system may falsely assume that a lift-off has occurred as no (X,Y) coordinates are being detected.

BRIEF DESCRIPTION OF THE INVENTION

In one embodiment, a bending wave touch system includes at least one sensor and a controller. The at least one sensor is coupled to a substrate and is responsive to vibrations in the substrate. The at least one sensor outputs signals. The controller receives the signals from the at least one sensor and identifies touch coordinates based on high frequency components of the signals when a touch on the substrate includes at least one of a tap, a drag and a lift-off. The controller identifies a status of a hold condition of the touch based on at least two different time averages of low frequency components of the signals.

In another embodiment, a method for identifying a hold condition on a bending wave touch panel includes detecting signals with at least one sensor bonded with a substrate. The signals are indicative of vibrations on the substrate of a bending wave touch panel. At least one of a tap and a drag are identified based on the signals. Two different time averages are calculated based on low frequency components of the signals and a hold condition following the at least one of the tap and the drag is identified based on amplitude levels of the two different time averages.

In yet another embodiment, a method for determining touch coordinates on a bending wave touch surface includes detecting signals with at least two sensors bonded with the bending wave touch surface. The signals are indicative of vibrations on the substrate of a bending wave touch panel. The signals are low pass filtered to pass low frequency components below 100 Hz. The touch coordinates of a single touch on the touch surface are determined based on ratios of the low frequency components.

DETAILED DESCRIPTION OF THE INVENTION

Figure 1:
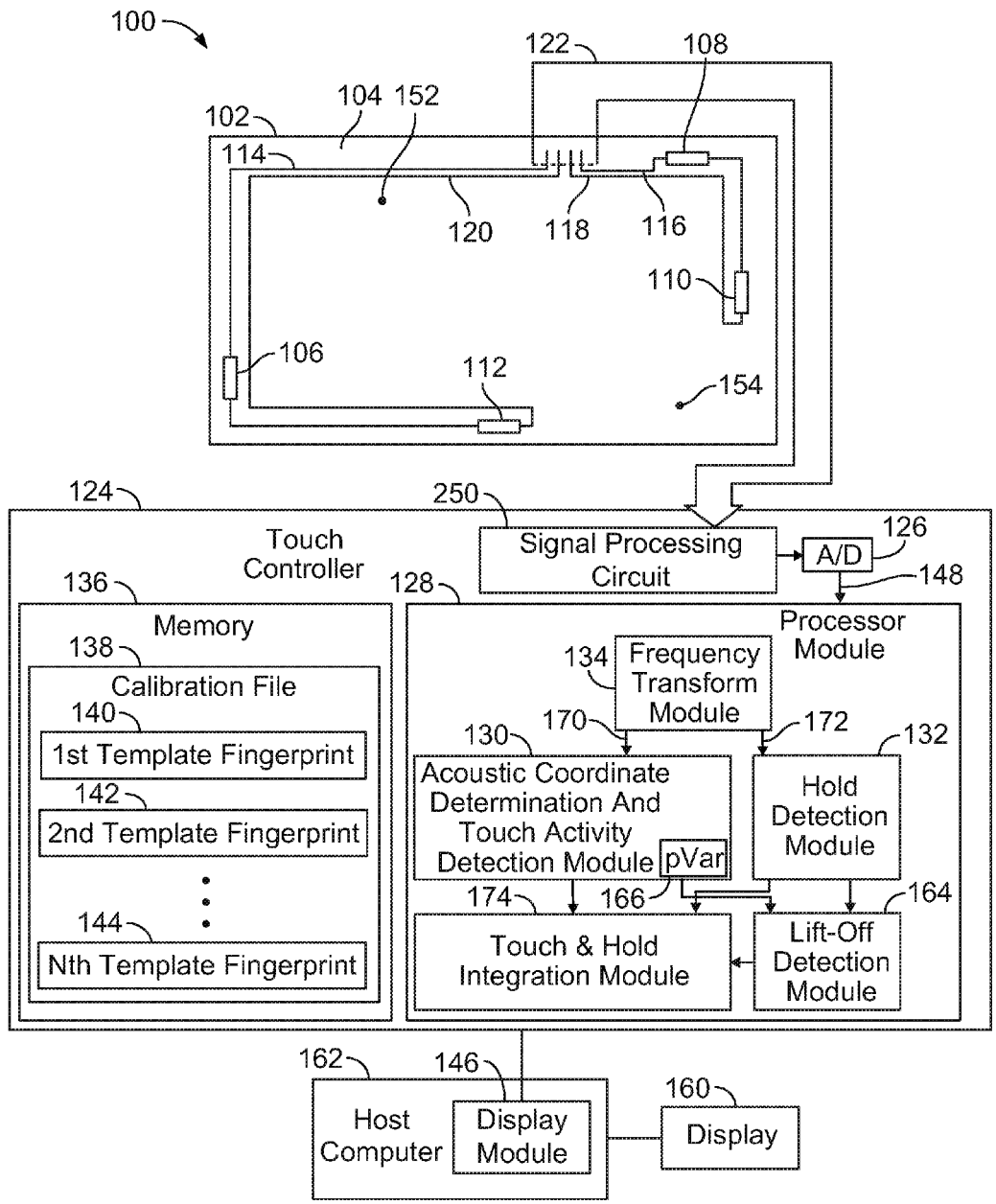
FIG. 1 illustrates a bending wave touch system formed in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. Further, it should be understood by one skilled in the art that many processing steps may be accomplished by either analog circuitry or by numerical digital processing. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 illustrates a bending wave touch system 100. In the illustrated system 100, acoustic fingerprints are detected. Other bending wave touch systems may detect signals and identify locations of touches based on other comparisons, such as, but not limited to, time-of-flight and time correlations. For example, the acoustic fingerprint based touch system 100 may be a system in which the bending waves are touch generated and detected in the audio frequency range of about two kilohertz (kHz) to twenty kHz and/or the low ultrasonic frequency range below one megahertz (MHz).

Touch panel 102 has a substrate 104, such as a sheet of glass, aluminum or other material, to which sensors 106, 108, 110 and 112 and associated traces 114, 116, 118 and 120 are coupled. The sensors 106-112 may be directly coupled or coupled through another object, such as a wedge, to the substrate 104. The sensors 106-112 may be piezoelectric sensors, which may be referred to as "piezos". The sensors 106-112 may also be referred to as microphones. Other types of sensor(s) (not shown), such as accelerometers and strain gauges, may be used to detect local motion or strain of the substrate 104. The sensors 106, 108, 110 and 112 detect sound and transmit sensor signals along the traces 114, 116, 118 and 120 which interface with a touchscreen cable 122 to convey the sensor signals to controller 124, which may be a touchscreen controller 124 according to a specific embodiment. In the embodiment shown in FIG. 1, the voltage difference between traces 114 and 120 is one analog signal, or monophonic audio stream, generated by the combination of sensors 106 and 112, which may be connected in series or anti-series. If connected in anti-series, the combination of sensors 108 and 110 produces an analog signal corresponding to the voltage difference between traces 116 and 118. Therefore, two sensors connected in anti-series may be connected to a single electronics channel. Alternatively, sensors 112 and 110 may optionally be removed such that each of the sensors 106 and 108 produces one analog signal. In other embodiments, more than two analog signals may be produced with either altered trace interconnections and/or additional sensors (not shown).

It should be understood that the sensors 106, 108, 110 and 112 are not limited to the displayed placement with respect to the substrate 104 and/or each other. While for some configurations, such as transparent touchscreen applications, it may be generally preferable to locate sensors 106, 108, 110 and 112 proximate the perimeter of the substrate 104, for other configurations such as opaque touch system applications, sensors 106, 108, 110 and 120 may be located anywhere within the area of substrate 104. Also, different numbers of sensors may be used. For example, one, two or three sensors may be used, producing one, two or three analog signals, respectively.

The bending wave touch surface 102, which may be a touch panel 102 may be formed of a non-opaque material such as glass and mounted in front of a display 160 that may support a graphical user interface (GUI) displaying buttons and icons or other graphical representations. In other embodiments, the touch panel 102 may be formed of an opaque or non-opaque material and may be located physically separate from display 160, such as to function as a track pad. In either case, the exposed touch surface of substrate 104 may be provided with a surface treatment to enhance the generation of bending waves via frictional effects. Anti-glare surface treatments commonly used with touchscreens for optical reasons provide such desired frictional effects. In other embodiments, the bending wave touch surface may be any surface with sensors attached thereto, where the sensors are coupled to a controller to determine touch coordinates for touches to the surface.

In general, the touch system 100 recognizes the sound created when the substrate 104 is touched at a given position that may be described as an (X,Y) coordinate location. It should be understood that other coordinate systems may be used, such as polar coordinates with a radius and angle about the origin. A touch event at each different position on the substrate 104 generates a unique sound. More specifically, when a user touches a point on the substrate 104, one or more sensors 106, 108, 110 and 112 on the substrate 104 detect the bending wave propagated sound and represent the sound as a signal. If only touch coordinates are desired, the signals from the sensors 106-112 may be manipulated such that in some embodiments, only information about the touch coordinate(s) are retained. However, if hold conditions are to be detected, at least low frequency components of the signals are retained, as discussed further below. It should be understood that the low frequency components may not necessarily be due to bending waves and possibly may be due to quasi-static mechanical deformations.

A memory 136 may store a calibration file 138 that contains a set of acoustic fingerprints to allow the user to successfully interact with the display 160. Prior to normal use, (X,Y) coordinate positions on the touch panel 102 are associated with the sensor signals that are generated when a series of known (X,Y) coordinate locations are touched. The signals may be processed and stored as acoustic fingerprints in the calibration file 138, such as first, second through N template fingerprints 140, 142 and 144.

By way of example, known location 152 may correspond to the second template fingerprint 142 and known location 154 may correspond to the Nth template fingerprint 144. The calibration file 138 therefore includes a plurality or collection of predetermined fingerprints or templates, each of which is associated with a particular (X,Y) location on the touch panel 102. The calibration file 138 of reference acoustic fingerprint templates may be used with a matching algorithm to identify the touch locations of live signals resulting from touch events. Interpolation methods may be used to provide (X,Y) coordinates with improved resolution.

In one embodiment, a signal processing circuit 250, which may be an analog circuit, (described below in more detail with respect to FIGS. 4 and 5) may be provided within the touchscreen controller 124 and receives the analog signals produced by sensors 106-112 over the touchscreen cable 122. In the embodiment shown, two analog signals are received although more or less signals may be received in other embodiments. In one embodiment the signal processing circuit 250 may provide approximate signal equalization across the range of frequencies detected by the sensors 106-112. The signal processing circuit 250 may process the analog signals, then pass the processed signals to an analog to digital (A/D) converter 126. The A/D converter 126 outputs digitized signals 148 to a processor module 128. A frequency transform module 134 may perform a frequency transform, such as a Fourier transform or a Fast Fourier Transform (FFT), on the digitized signals 148. In other specific embodiments, a discrete Fourier Transform (DFT), filter bank, wavelet analysis or the like could be used. The FFT, for example, produces amplitude and phase information corresponding to frequency bins that each includes a range of frequencies. For example, a sequence of 512 time domain signal samples may be processed by an FFT to produce an amplitude and a phase in each of 256 frequency bins that span the audio frequency range.

The frequency transform module 134 outputs a frequency transform data set of frequency components associated with each of the sensor signals to an acoustic coordinate determination and touch activity detection module 130 and a hold detection module 132 via high frequency (HF) channel 170 and low frequency (LF) channel 172, respectively. The acoustic coordinate determination and touch activity detection module 130 may detect touch events such as taps, drags and lift-offs, while the hold detection module 132 may detect hold conditions or events. In one embodiment, the frequency components output to the acoustic coordinate determination and touch activity detection module 130 may be frequency components above two kHz and may herein be referred to as HF components. In another embodiment, the HF components may be above 100 Hertz. The frequency components output to the hold detection module 132 may be frequency components below two kHz and may herein be referred to as LF components or ultra-low frequency (ULF) components. In another embodiment, the LF components output to the hold detection module 132 may be below 100 Hertz or below sixty Hertz. In another embodiment, the frequency transform module 134 may output the FFT Bin 0 data to the hold detection module 132. For example, the FFT Bin 0 data typically contains little or no useful coordinate location information and thus is typically not used by the acoustic coordinate determination and touch activity detection module 130. In some embodiments, the LF and HF components may be non-overlapping, and thus the LF and HF frequencies are different from each other.

In one embodiment, the sensors 106-112 used for hold detection may be the same sensors used for touch activity detection. In another embodiment, different sensors may be used for both touch and hold detection, or a subset of the sensors used for touch activity detection may be used for hold detection.

The acoustic coordinate determination and touch activity detection module 130 may determine whether a touch event has occurred by extracting, for example, amplitude magnitude information from each of the frequency transform signals, and optionally, phase information from each of the frequency transform signals. The processor module 128 and/or acoustic coordinate determination and touch activity detection module 130 may construct a profile or acoustic fingerprint associated with the touch event based on the amplitude magnitude information. In another embodiment, the processor module 128 may construct a profile or acoustic fingerprint associated with the touch event that is based on both the amplitude magnitude information and the phase information. In yet other embodiments, the processor module 128 may construct the acoustic fingerprint based on the phase information or based on other information within the digitized signals 148.

The acoustic coordinate determination and touch activity detection module 130 may also monitor the level of HF signal even if touch coordinates cannot be determined. For example, the degree of randomness in the phases computed by the FFT tends to be high if signals are purely electronic noise and be reduced when touch activity generates bending wave signals. One measure of the degree of phase randomness is the sum over all pairs of neighboring FFT bins of the absolute magnitude of the difference of the FFT computed phases of the neighboring FFT bins; this measure may be referred to as "phase variation" or in an abbreviated name "pVar". A drop in pVar below a threshold can be indicative of touch activity signals even when (X,Y) coordinates are not or cannot be computed. pVar is just one possible measure of the degree of signal randomness and signal randomness is just one possible means to recognize touch activity. Any other measure of touch activity, such as, for example, the degree of cross-correlation between the sensor signals or the coherence measure, or an increase in sensor signal amplitude, such as to exceed a threshold, may be substituted for pVar 166 in module 130, according to other specific embodiments.

In an embodiment using pVar, a numerical value for pVar is computed from the FFT generated phases every time the FFT is computed. In some embodiments, in order for an acoustic fingerprint to be a match, pVar 166 may need to be below a predetermined level or threshold. As discussed further below, lift-off events, wherein the object is removed from the substrate 104, may not generate frequency components that correspond to a template fingerprint 140-144. However, a lift-off detection module 164 may determine that a lift-off has occurred based on the pVar 166, possibly when the hold detection module 132 also detects a sufficiently large increase within the LF components of the signal, even though there is no match to a calibration file, acoustic fingerprint, time comparisons, look-up tables, and the like. It should be understood that other signal processing and comparison techniques may be used to determine that touch activity has occurred even when touch coordinates may not be determined.

In some embodiments, a touch and hold integration module 174 may identify a valid hold condition only if the hold follows a valid touch event, such as a tap or a drag, after which an object may still be in contact with the substrate 104. Therefore, if no associated tap or drag is detected, the system 100 may ignore signals that indicate a hold condition. Furthermore, if a hold condition is detected by the hold detection module 132 after the lift-off detection module 164 identifies a lift-off, the touch and hold integration module 174 may determine that the hold is not a valid hold.

The touch system 100 may detect single touch events, such as to select a particular icon displayed on the display 160. Additionally, a user may wish to select an item with a tap and then drag and/or hold the object in connection with the substrate 104 to activate certain features. When the user is done, the object (e.g. finger, stylus) is removed from the substrate 104, resulting in a lift-off event. A hold condition may be defined as when a user has touched the substrate 104 with an object and is holding the object on the substrate 104. Tap, drag and hold conditions are all examples of a contact condition in which the object (such as the user's finger) is in physical contact with the surface of substrate 104. The contact condition is identified based on at least a portion of the LF components of the signals. During a contact condition system 100 may or might not be able to detect new (X,Y) coordinate locations. For a tap or drag, system 100 typically will detect new (X,Y) coordinate locations, but perhaps not reliably so for a slow drag with a light touch force. A hold condition is a special case of a contact condition for which it is typically not possible to detect new (X,Y) coordinates.

The tap, drag and lift-off events generate significant levels of HF content. Therefore, in some embodiments, taps, drags and lift-offs may be identified based only on HF components. The hold condition or event, however, does not generate a significant level of HF content and thus, if touch detection is based solely on HF content, the system 100 may be unable to determine that a hold is occurring. However, muscle tremors and small movements, such as normal involuntary movements of the user, cause small movements of the object and as a result generate levels of LF content that may be used by the hold detection module 132 to identify whether a hold is occurring. Therefore, a hold may be identified independent of HF components, and may be identified based only on LF components. In some embodiments, the LF components may also be used by the lift-off detection module 164 to determine if a lift-off has occurred.

During typical use, when a user touches the touch panel 102 and a touch, drag or lift-off is detected, the processor module 128 compares the live-touch acoustic fingerprint to at least a subset of the first, second through N template fingerprints 140, 142 and 144 stored in the calibration file 138. The best matching acoustic fingerprint or template may then be used to identify the location of the touch event.

The processor module 128 may then pass the coordinates (e.g., X,Y) to a display module 146 that may be stored within one or more modules of firmware or software. The display module 146 may be a graphical user interface (GUI) module such as the Microsoft Windows® operating system, for example. In one embodiment, the display module 146 is run on a host computer 162 that also runs an application code of interest to the user. The display module 146 determines whether the coordinates indicate a selection of a button or icon displayed on the display 160. If a button is selected, the host computer 162 or other component(s) (not shown) may take further action based on the functionality associated with the particular button.

A hold may be used, for example, during menu selection. A user may tap on an icon, and by holding the object on the substrate 104, the system 100 detects the hold and in response displays a menu or list. The user may drag the object along the list, then may select a particular item or display another sub-menu by conducting a brief hold. A menu selection may be made by lifting the object off the substrate 104 or with a subsequent tap, for example.

The user may also wish to drag and drop an item, such as moving an icon to a different location on the display 160 or moving a file into a folder. In some cases the user may pause and hold the object on the substrate 104, and the system 100 may recognize that the user is holding the item and does not activate a response. Instead, the system 100 may simply detect the hold condition and wait for the user to take further action. If the user removed the object from the substrate 104, then the system 100 may place the item on the display 160 at the current (X,Y) location.

In some embodiments, the system 100 may wait for a minimum hold time before invoking a response. For example, the user may display a menu, and the system 100 may wait for a hold to be held for a minimum time period before activating the selection. Also, holds may be used to invoke actions such as scrolling. If the user touches and holds a scroll icon, for example, the system 100 may scroll the information on the display 160 as long as the hold condition is active.

Figure 2:
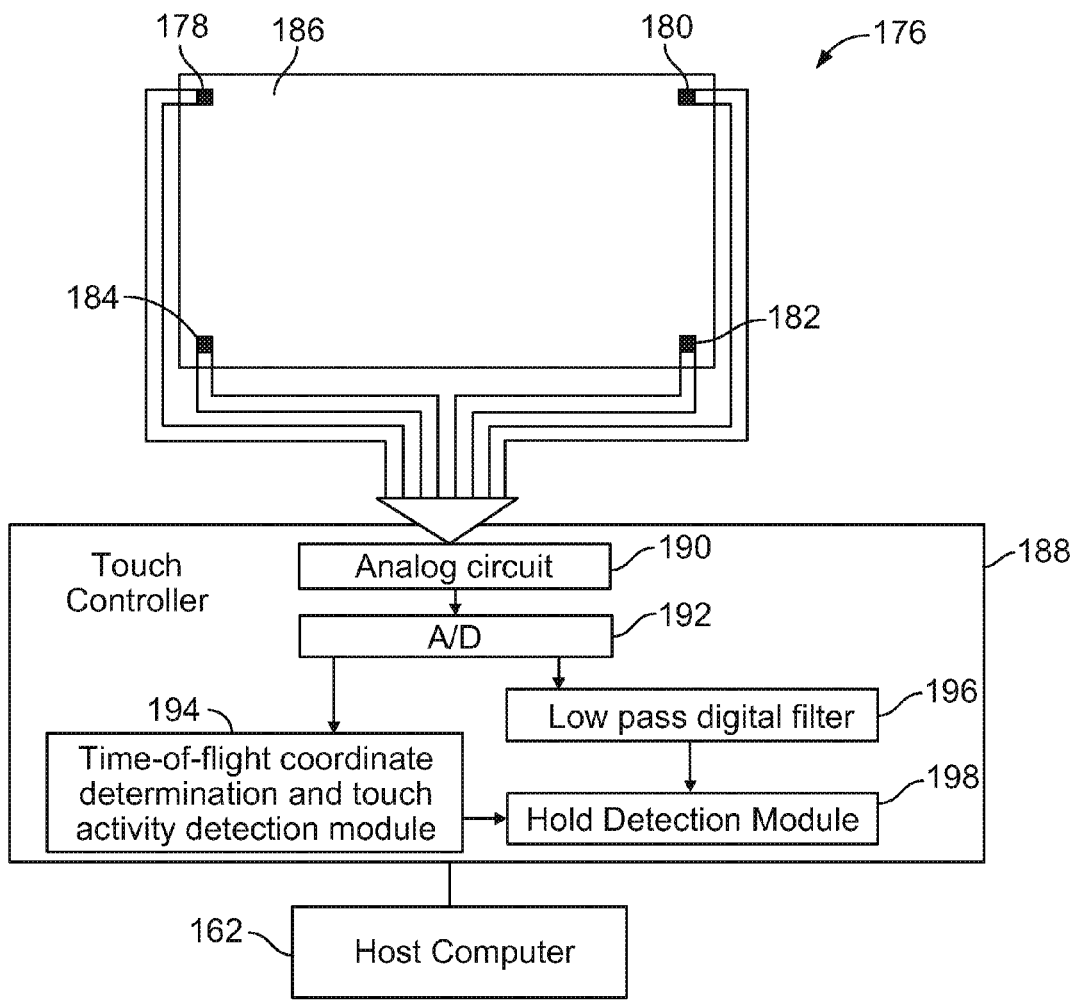
FIG. 2 illustrates another bending-wave touch system formed in accordance with an embodiment of the present invention.

FIG. 2 illustrates an alternative bending-wave touch system 176 that is based on time-of-flight measurement. Sensors 178, 180, 182 and 184, such as piezos, are placed at each of the four corners of touch substrate 186. As in FIG. 1 sensor signals are received by touchscreen controller 188, conditioned with an analog circuit 190 and digitized with an A/D converter 192. The output of the A/D converter 192, including HF components, is processed by a time-of-flight coordinate determination and touch activity detection module 194 to determine the time of arrival of touch generated signals at each of the four corners. Via triangulation, coordinates (e.g., X,Y) are determined. However, during a hold, insufficient signals are generated to determine (X,Y) touch coordinates. A hold detection module 198 is provided with LF signal components via a low pass filter 196. The low pass filter 196 may be a digital filter positioned downstream of the A/D converter 192 used in the time-of-flight calculations. Alternatively, an analog low-pass filter (not shown) may extract LF signal components upstream of a second A/D converter (also not shown) which may be dedicated for the hold detection module 198. While the coordinate determination system of FIG. 2 differs significantly from the acoustic fingerprinting system illustrated in FIG. 1, the hold detection operations of FIG. 1 and FIG. 2 may operate similarly.

Figure 3:
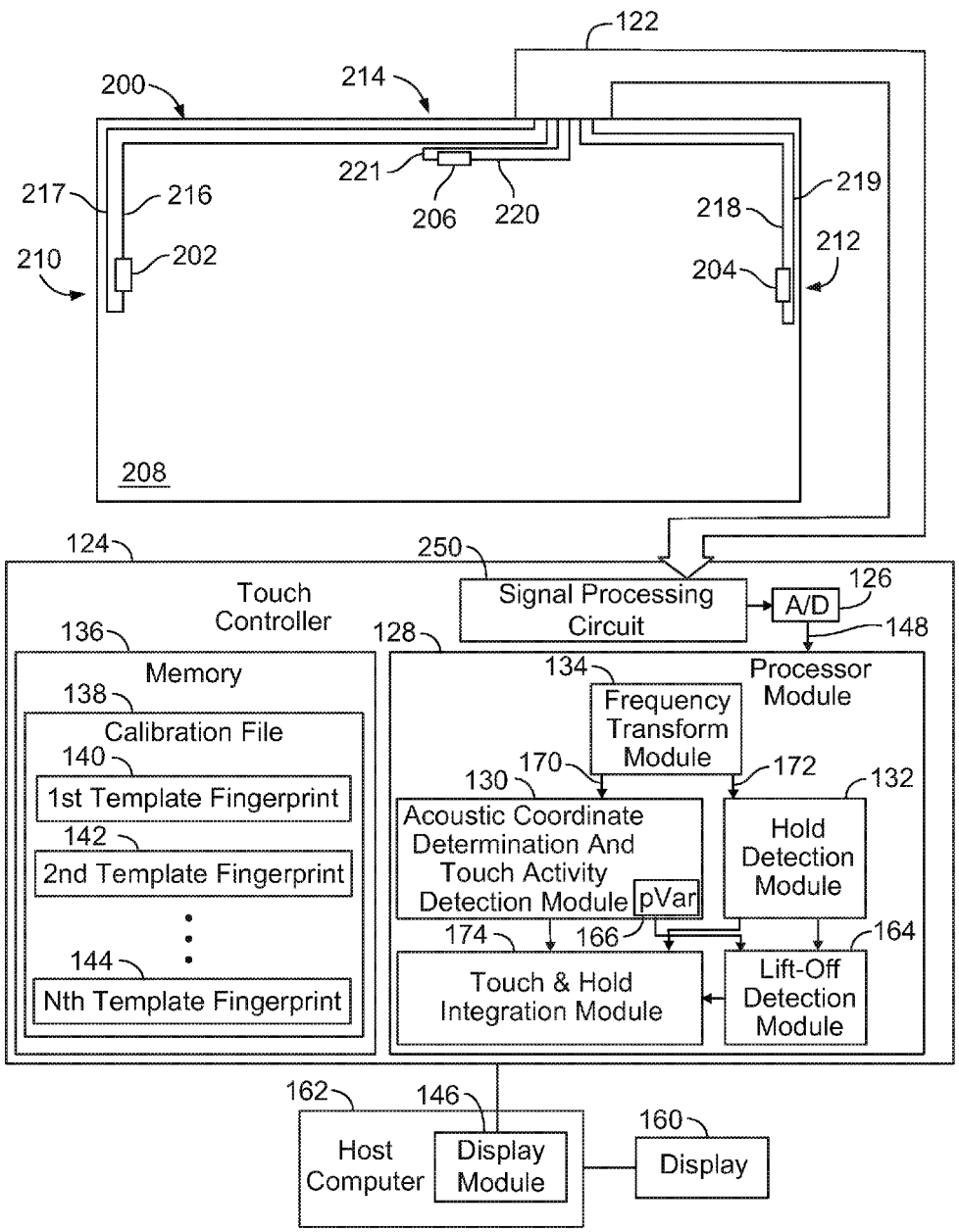
FIG. 3 illustrates another bending wave touch system with a touch panel having three sensors formed in accordance with an embodiment of the present invention.

FIG. 3 illustrates a touch panel 200 having three sensors 202, 204 and 206 and associated traces 216, 217, 218, 219, 220 and 221 that may be located on a substrate 208. In some embodiments, the traces associated with ground may be tied together. Signal processing circuit 250 may receive signals from the sensors 202, 204 and 206 with either differential amplifiers or single ended amplifiers. The wiring shown in FIG. 3 would support differential inputs. With the option of the single ended inputs, only four wires are needed. The sensors 202, 204 and 206 are located in three different areas of substrate 208, such as proximate a left side 210, right side 212 and top 214, respectively. Each of the sensors 202, 204 and 206 may produce an analog signal that is conveyed separately within the cable 122 to the controller 124 and digitized into different digital channels by the A/D converter 126.

In some touchscreen systems, the piezos and/or associated processing and amplification circuit(s) may result in a high pass frequency response being passed to the frequency transform module 134. However, to detect a hold event, the LF components, such as frequencies below two kHz, are evaluated. At sufficiently low frequencies, the capacitance C associated with the piezos combined with the effective input impedance R of the electrodes forms a high-pass RC filter. Care is required that this unintended high-pass RC filter does not eliminate or overly attenuate the desired LF signals used by the hold detection module 132. In one embodiment, the input impedance may be raised, such as to one Mega Ohm to result in more low frequency information, and the overall gain of the circuit may be lowered to avoid clipping in the amplifiers. In another embodiment, one piezo may be used per channel as shown in FIG. 3, resulting in an increase in the capacitance of the piezo configuration. If capacitance is increased, it may be desirable to reduce the amplification circuit input impedance.

In one embodiment, the signal processing circuit 250 may receive the signal from the sensors 202-206 and provide two separate paths, one path providing a low pass filter with low or no gain for hold detection and the other providing a high pass response with some level of gain, thus amplifying the HF signals for (X,Y) touch detection. The outputs of the two paths may be summed together or used separately.

Figure 4:
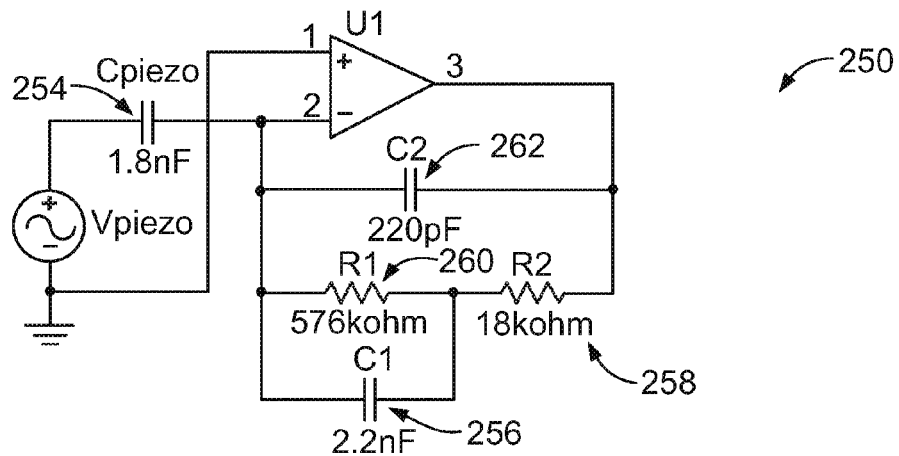
FIG. 4 illustrates a signal processing circuit for processing signals received from the sensors of FIG. 3 formed in accordance with an embodiment of the present invention.
Figure 5:
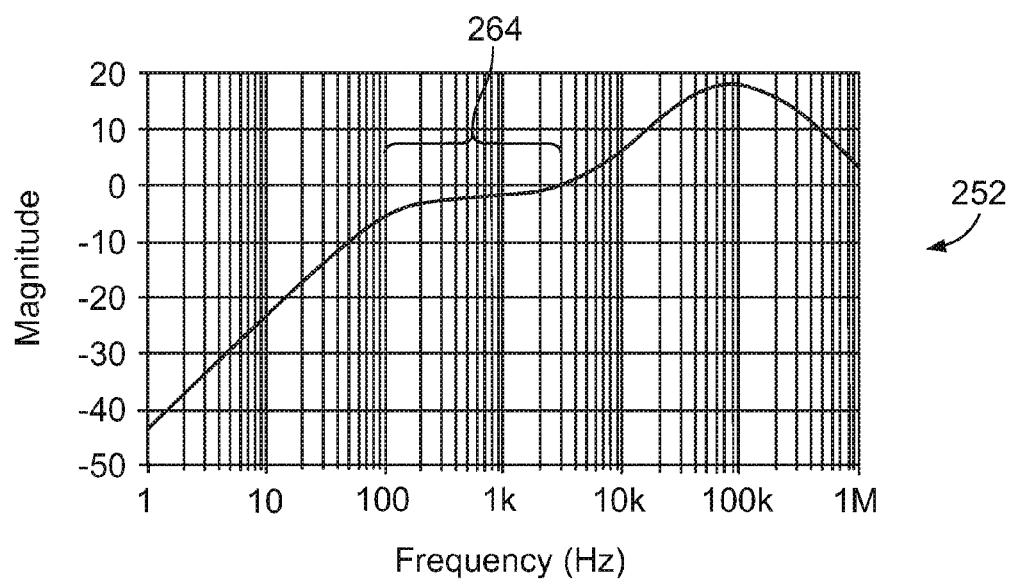
FIG. 5 illustrates an output frequency response of the circuit of FIG. 4 in accordance with an embodiment of the present invention.

FIG. 4 illustrates an exemplary signal processing circuit 250 that may be used to achieve an output frequency response 252 as shown in FIG. 5. A circuit 250 may be provided for each sensor 202-206 or piezo, or may be provided for each channel, which, for example, may have more than one sensor 106-112 connected in series or anti-series. The circuit 250 may be configured to provide a non-monotonic frequency response, such as to favor lower frequencies, such as frequencies around 100 Hz. It should be understood that the particular values of resistances and capacitances shown in FIG. 4 for circuit 250 are representative for the processing of signals received from a piezo having a capacitance 254 of around 1.8 nanofarad (nF), however different piezos may have different levels of capacitance and thus component values within circuit 250 should be adapted accordingly. In general, capacitor C2 262 may provide stability to avoid oscillations and also provides a response roll off in very high frequencies. Resistor R2 258 provides a gain setting point at around 20 kHz, resistor R1 260 and capacitor C1 256 provide a shelf 264 in the frequency response 252 between about 100 Hz and 4 kHz. To adjust or tune the frequency response 252 as desired, different values of capacitors (C1 256 and C2 262) and resistors (R1 260 and R2 258) may be used, additional capacitors and resistors (not shown) may be used, and different values of the capacitors (C1 256 and C2 262) and resistors (R1 260 and R2 258) may be used with piezos having different levels of capacitance 254. Use of a circuit such as circuit 250 allows both the LF signal components used for the hold detection and the HF signal components used for coordinate determination to both be within the dynamic range of a common A/D convertor, thus eliminating the need for separate A/D convertors for HF and LF signal components.

Figure 6:
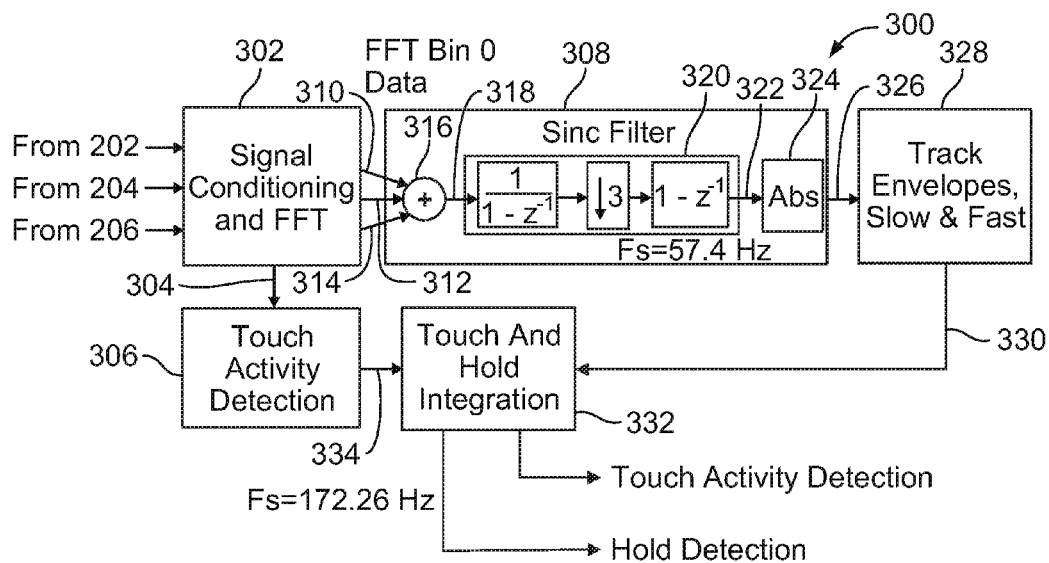
FIG. 6 illustrates a block diagram for processing signals from sensors on a touch panel and determining whether a hold condition or event is occurring in accordance with an embodiment of the present invention.

FIG. 6 illustrates a block diagram 300 for processing signals from sensors on a touch panel and determining whether a hold condition is occurring. In some embodiments, the detection of touch activity or touch events occurs simultaneously and is provided as input to the detection and determination of whether hold events are occurring and are valid. The touch panel 200 configuration of FIG. 3 is primarily used in the description below, wherein the three sensors 202, 204 and 206 provide input signals on individual channels. However, it should be understood that other configurations may be used, such as one sensor mounted on the substrate 208, sensors mounted in series or anti-series wherein more than one sensor is connected to a channel as shown in FIG. 1, sensors mounted symmetrically on the substrate 208, sensors mounted asymmetrically on the substrate 208, and the like.

Block 302 illustrates processing of the input signals from the sensors 202, 204 and 206, such as may be accomplished by the signal processing circuit 250, the A/D converter 126, and the frequency transform module 134. In one embodiment, the input signals may be digitized by the A/D converter 126 without being processed by the circuit 250, or the input signals may be processed by the circuit 250 after being digitized. In another embodiment, the input signals may each be processed to provide two different streams of input data, that is, a high-pass filtered stream of three inputs for touch detection passed on the HF channel 170 to the acoustic coordinate determination and touch activity detection module 130 as shown in FIG. 1, and an unfiltered or low-pass filtered stream of three inputs for hold detection passed on the LF channel 172 to the hold detection module 132.

As shown in FIG. 6, the HF components or data used for touch detection may processed by FFT and sent via line 304 to block 306 for detection of touch events. Line 304 may be similar to the HF channel 170 of FIG. 1. Multiple inputs, such as the HF components from the three sensors 202, 204 and 206 may be added together or otherwise combined prior to being sent to the block 306, or may be sent via multiple lines 304 and combined within the block 306. As discussed previously, different types of bending wave detection may be accomplished depending on the type of system being used, such as acoustic fingerprinting, time-of-flight, time correlation, and the like. Touch activity or events detected by the block 306 are passed via line 334 to block 332.

Returning to block 302, the LF components are sent to block 308. For example, FFT Bin 0 data corresponding to each of the input signals from sensors 202, 204 and 206 may be sent on lines 310, 312 and 314 to a summing circuit 316. By way of example only, each of the lines 310, 312 and 314 may correspond to a separate LF channel 172 (as shown in FIG. 1). Therefore, LF components of the signals from the sensors 202, 204 and 206 may be added in phase in the time-domain to obtain a single input signal on line 318. By combining the signals on lines 310, 312 and 314, environmental noise may be eliminated or mitigated. Environmental noise may be defined as events that occur off the substrate 208, such as music, traffic and the like, and that generate incoherent signals detected by the sensors 202-206. Events that occur on the substrate 208 include at least taps, drags, holds and lift-offs, and generate coherent signals or components that are correlated. In general, summing signals composed of coherent and incoherent components results in amplification of coherent components while the incoherent components remain the same or are reduced. As a result, the ratio of coherent components (signal) to incoherent components (noise) improves. Therefore, in some embodiments, detecting signals with more than one sensor 202-206 may provide better elimination of environmental noise. However, as discussed previously, a single sensor may also be used. As discussed later with respect to FIG. 15, for systems supporting simultaneous touches, it may be advantageous to delay the summing of the sensor signals with the summing circuit 316 until after block 320.

The use of FFT Bin 0 as part of a low pass filter may be a matter of convenience in systems where FFTs are computed for use in coordinate determinations. Mathematically, the result stored in FFT Bin 0 is the average of time-domain input data to the FFT. Therefore, inputs to summing circuit 316 may also be LF components of the sensor or piezo signals derived by other methods and/or circuits, such as a low pass RC filter.

Block 320 provides decimation and low-pass filtering of the signals on line 318. Low-pass filtering, for example, only passes the signals below a predetermined cut-off frequency. For example, block 320 illustrates a Sinc filter combined with a decimator. It should be understood that multiple stages of the Sinc filter may be used in cascade. In one embodiment, four stages (not shown) of the Sinc filter may be used to increase side-lobe and high-frequency attenuation. Because the LF components are changing slowly, the signal may be decimated, that is, the sampling rate may be reduced, such as to minimize operation cost and undesired noise. For example, the sampling rate of approximately 44 kHz used for touch detection may be reduced, such as to approximately 57.4 Hz by first computing a time averaged signal after every 256 time samples and then averaging or decimating by another factor of 3.

In one embodiment, block 320 is configured to reject HF components, filter out sixty Hz line frequency and associated harmonics, and reduce the sampling rate. Sixty Hz line frequency may experience high levels of noise in the United States, while in other geographic locations other line frequencies, such as fifty Hz, may be affected. The block 320 may therefore be modified to reject or filter other frequencies or bands of frequencies.

Figure 7:
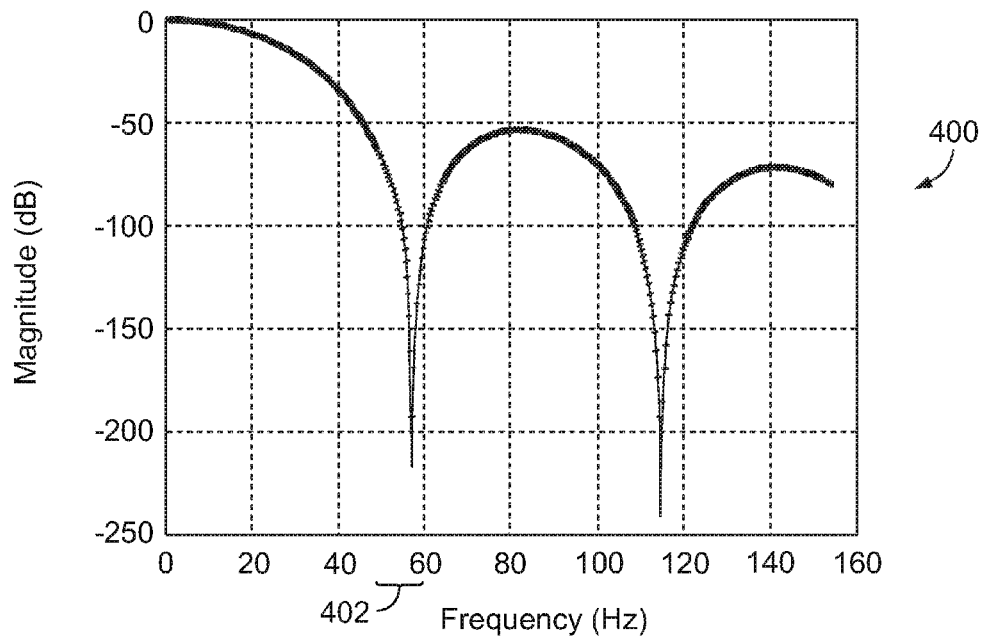
FIG. 7 illustrates a frequency response in accordance with an embodiment of the present invention based on a Sinc filter as shown in FIG. 6.

FIG. 7 illustrates a frequency response 400 based on a four-stage Sinc filter such as the Sinc filter of block 320 in FIG. 6. The response 400 illustrates that a frequency range 402 of undesirable frequency components, between approximately fifty Hz and sixty Hz, is suppressed.

Figure 8:
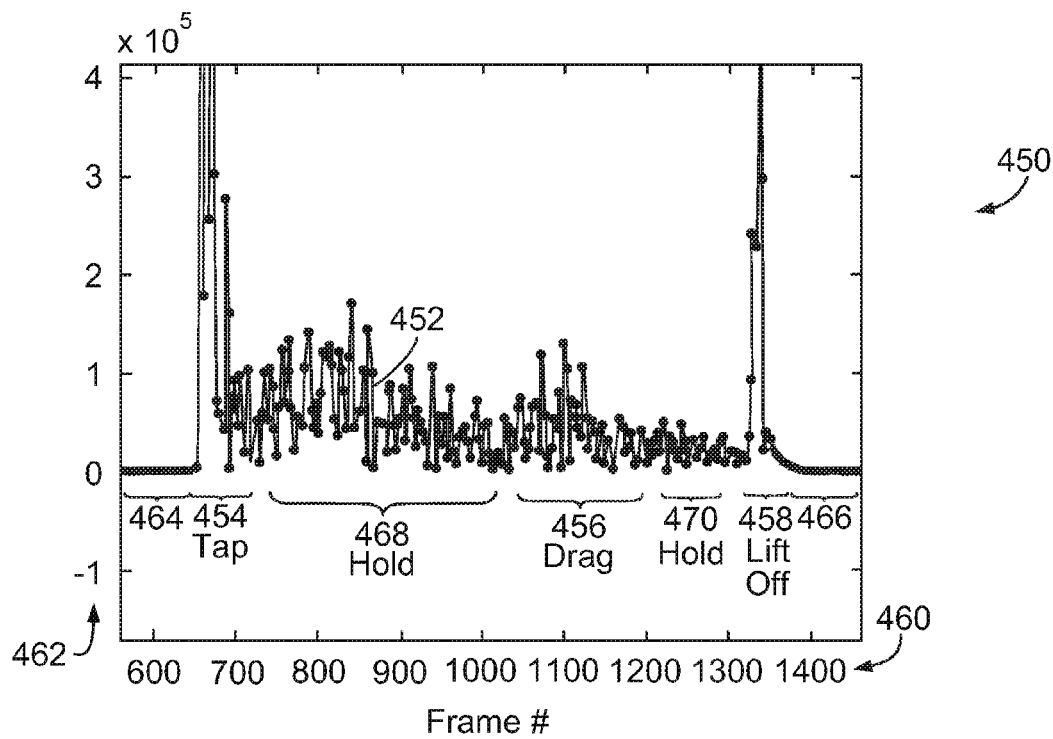
FIG. 8 is a graph illustrating a decimated input signal over time in accordance with an embodiment of the present invention.

FIG. 8 is a graph 450 illustrating a decimated signal 452 over time. The decimated input signal may be the absolute value of the output of the Sinc filter or block 320 of FIG. 6 and thus includes LF components. Block 324 provides the absolute value function. Horizontal axis 460 indicates frame number while vertical axis 462 indicates the absolute value of signal amplitude. As an example for 256 sample frames at 44 kHz, each frame corresponds to about 6 milliseconds of time. A series of touch events such as an initial tap 454, a drag 456 of an object on the substrate 208, and liftoff 458 of the object may be detected by the touch activity detection block 306 of FIG. 6. Background activity 464 and 466, shown prior to the tap 454 and after the liftoff 458, respectively, indicate very little LF components or energy. However, during the tap 454 and the lift-off 458, the signal 452 includes HF and LF components. During the drag 456, as well as holds 468 and 470, the LF activity is greater than the background activity 464 and 466. Such increased LF activity provides a means to identify a contact condition independent of whether or not (X,Y) coordinates are being generated. If the drag 456 does result in (X,Y) coordinates being generated, the presence of a contact condition is known independent of LF activity. However for holds 468 and 470, LF activity is the only indication that the object remains in contact with the substrate 104.

Therefore, FIG. 8 illustrates that taps, holds, drags and lift-offs may all have large amounts of LF energy. Based on LF components alone, however, holds and drags may be difficult to distinguish from one another. In addition, not all lift-offs generate HF components that are correlated to a known (X,Y) location, and thus a match may not be identified from within the calibration file 138 (as shown in FIG. 1). Therefore, hold detection is used together with touch detection to accurately determine whether a hold event is occurring.

For some applications it may be important to determine whether or not the object is in contact with the substrate 104, but not a requirement to reliably distinguish between hold and drag conditions. For example, during drag 456 (see FIG. 8) the module 130 may fail to reconstruct touch coordinates while a "hold" condition is still determined from low frequency signal components. In this scenario the host computer 162 is still correctly informed that the object remains in contact with the substrate 104 during drag 456. Such an embodiment is an example where the touchscreen controller 124 is configured to identify a hold condition based on LF components of the signals when the touch remains in contact with the substrate 104 but is not necessarily stationary with respect to the touch coordinates (X,Y).

Returning to FIG. 6, the low-pass filtered and decimated signal may be sent on line 322 to block 324 where the absolute value of the signal is determined in order to produce a signal such as signal 452 of FIG. 8. The absolute value of the signal may be sent on line 326 to block 328 and used to determine two signal envelopes, one fast averaged envelope and one slow averaged envelope, as discussed further below. Each envelope is a time average of the signal 452. It should be understood that in one embodiment one envelope may be used while in another embodiment more than two envelopes may be used. In an analogy with the relatively smooth envelope of a rapidly varying amplitude modulated radio frequency signal, as in AM radio, as used herein the term "envelope" refers to a relatively smooth signal extracted from a more rapidly varying signal. An envelope as used herein may also be referred to as a trend line. The envelopes are passed on line 330 to block 332, wherein the envelope signals and the touch detection signals may both be used to identify whether a valid hold is occurring.

In general, a slow averaged envelope slowly averages the absolute value of the signal 452 over a relatively longer period of time, tracking the maximum envelope of the signal 452 while moderating changes due to touch activity, such as those seen during the tap 454 and lift-off 458 of FIG. 8. In contrast, a fast averaged envelope responds more quickly to ups and downs of the signal 452. In one embodiment, the slow and fast averaged envelopes may employ first-order infinite impulse response (IIR) filters with different time-constants for averaging.

In addition to the slow and fast averaged envelopes, the background activity 464 and 466 is measured. Noise environments change, which may increase or decrease the level of background energy, and thus the background activity 464 is determined whenever touch events, hold conditions or other prominent signal peaks, such as signals that exceed an amplitude threshold, are not detected by the system 100. In one embodiment, the background activity 464 may be determined by tracking a minimum of the LF signal. In another embodiment, a minimum of averages, such as over ten samples, may be determined from within the most recent few seconds of the LF components to determine a level of background activity 464. In yet another embodiment, a background sequence may be defined as ten consecutive decimated frames. Every five frames, a new background sequence may be defined which results in a fifty percent overlap between sequences. The average of each sequence may be stored in a memory, such as a first-in first-out (FIFO) data structure that holds, for example, the ten most recent values. The minimum background level at a given frame may be defined as the minimum value in the FIFO structure. Any average that includes frames representative of touch events, which have much greater LF energy, is not pushed into the FIFO structure. In one embodiment, the minimum sequence average may be selected as the background activity 464.

A technical effect of at least one embodiment is the ability to determine whether a hold condition or event is active based on whether a touch event or touch activity has been detected as well as a comparison of at least one of a ratio of the fast averaged envelope over the slow averaged envelope (fast envelope/slow envelope) and a ratio of the fast averaged envelope over the background activity (fast envelope/background). This allows the system 100 to distinguish between drags and holds, which may appear similar in the LF components, as well as to identify events that may appear to be holds but that do not follow any touch event, such as noise that may be caused by a very noisy environment.

Figure 9:
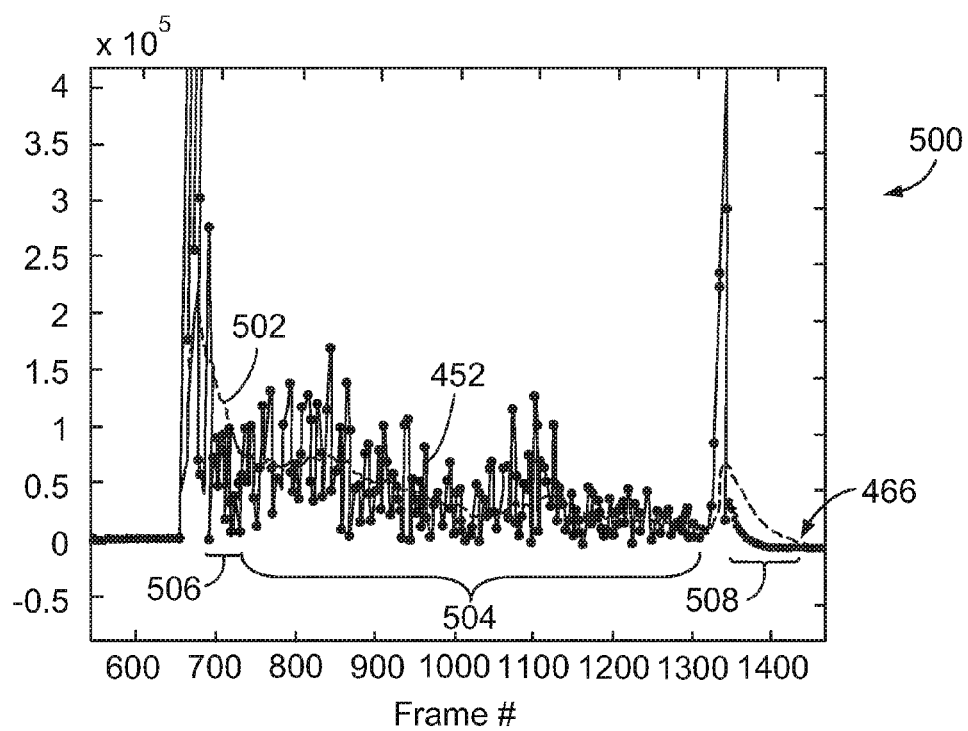
FIG. 9 illustrates a graph showing the decimated input and associated fast averaged envelope in accordance with an embodiment of the present invention.

FIG. 9 illustrates a graph 500 showing the decimated signal 452 and associated fast averaged envelope 502. The graph 450 of FIG. 8 and the graph 500 indicate the LF components of the same detected sequence, that is, tap 454, hold 468, drag 456, hold 470 and lift-off 458.

In one embodiment, a time-varying first-order IIR filter may be used to calculate the fast averaged envelope 502. The IIR filter may be represented by the following difference equation where "n" is the current frame number, "$x_n$" is the input and "$y_n$" is the output of the current frame:

$$y_n = \alpha y_{n-1} + (1-\alpha)x_n$$

Two different filter parameter values may be used. The first filter parameter value having α equal to 0.95 may be applied to the signal when the signal moves upward in amplitude. The second filter parameter value having α equal to 0.9 may be applied to the signal when it moves downward in amplitude. The two filter parameters may be chosen in order to have the fast averaged envelope 502 remain near the average of the signal 452.

Within area 504, the fast averaged envelope 502 remains near the average of the signal 452 through the holds 468 and 470 and the drag 456 (items 456, 468 and 470 shown correspondingly in FIG. 8). However, during the frames immediately following the tap 454 and lift-off 458, delay areas 506 and 508 indicate contaminated frames wherein the fast averaged envelope 502 has not yet reached the average of the decimated signal 452 during the holds and drag (area 504) or the level of the background activity 466. Within the delay area 508, fast averaged envelope 502 indicates that hold energy may still be present. Also, although not shown, if a single tap occurs without a hold or drag event following the tap, a delay area that indicates that hold energy may still be present may result in the frames immediately following the tap. Therefore, as there is HF energy present during taps, and in some cases, lift-offs and drags, these touch events may contaminate the fast averaged envelope 502.

To eliminate the contamination of the fast averaged envelope 502, the fast averaged envelope 502 may be set to zero or equal to the level of the background activity 464 or 466 during all touch events. Therefore, during each frame in which the acoustic coordinate determination and touch activity detection module 130 detects a touch event, the fast averaged envelope 502 is set to be equal to the most recently detected background activity level, such as background activity 464 of FIG. 8, or held, for example, at a logic zero.

Figure 10:
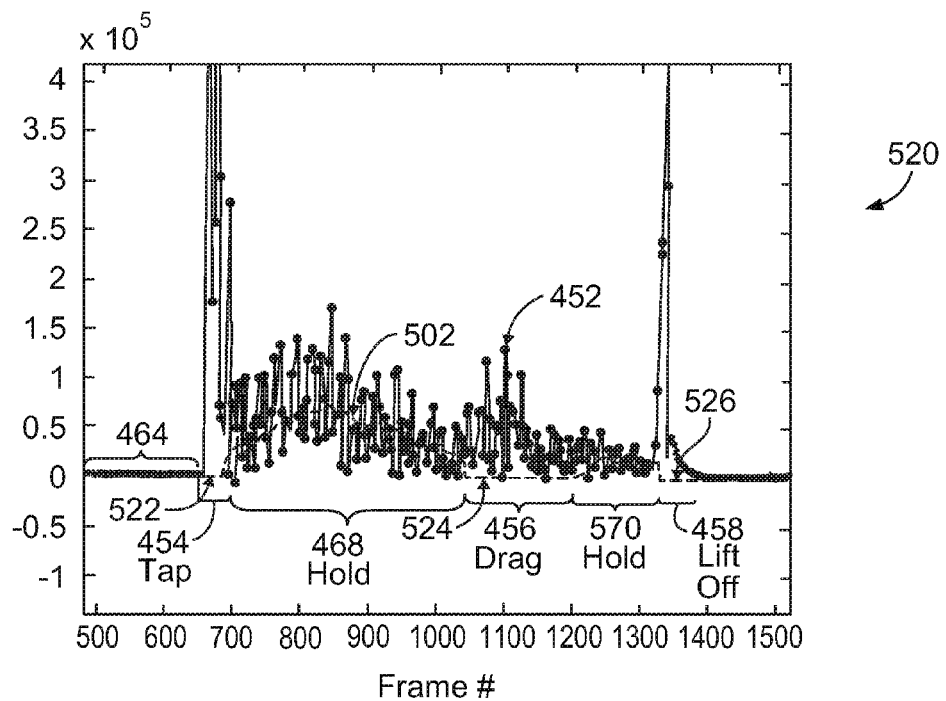
FIG. 10 illustrates a graph in which the fast averaged envelope is set to a level of background activity during detected touch events in accordance with an embodiment of the present invention.

FIG. 10 illustrates a graph 520 in which the fast averaged envelope 502 is set to the level of the background activity 464 during the detected touch events as well as an extended blackout period following the touch event. In one embodiment, the extended blackout period may be five frames, for example about 30 milliseconds, following the completion of the touch event to avoid contamination due to decaying but not completely damped vibrations on the substrate 208. Other numbers of frames or time durations may be used during the extended blackout period. The frame-rate of the signal 452 has been decimated as described above, and therefore the five frames represent frames within the decimated frame rate, which in some embodiments may be 57.4 frames per second, which may be slower than the touch detection frame rate, which in some embodiments may be 172.26 frames per second.

During zeroed periods 522, 524 and 526 the fast averaged envelope 502 is held to the level of the background activity 464. The zeroed periods 522, 524 and 526 correspond to the tap 454, drag 456 and lift-off 458 touch events, respectively, and include the extended blackout period that follows the last frame in which the applicable touch event is detected. Therefore, contamination of the fast averaged envelope 502 due to vibrations after the touch event is mitigated or eliminated.

Because the background LF energy is so small compared to the level of LF energy during a hold, a relative measure between the background activity 464 and the fast averaged envelope 502 may be used to identify a hold condition. If the ratio is close to one, for example, no hold is occurring. However, if the ratio of (fast envelope/background) is higher than a threshold, such as ten times higher than the background activity 464, a hold condition is indicated. During the zeroed periods 522, 524 and 526, a hold condition will not be satisfied as the fast averaged envelope 502 is set to the level of the background activity 464.

Figure 11:
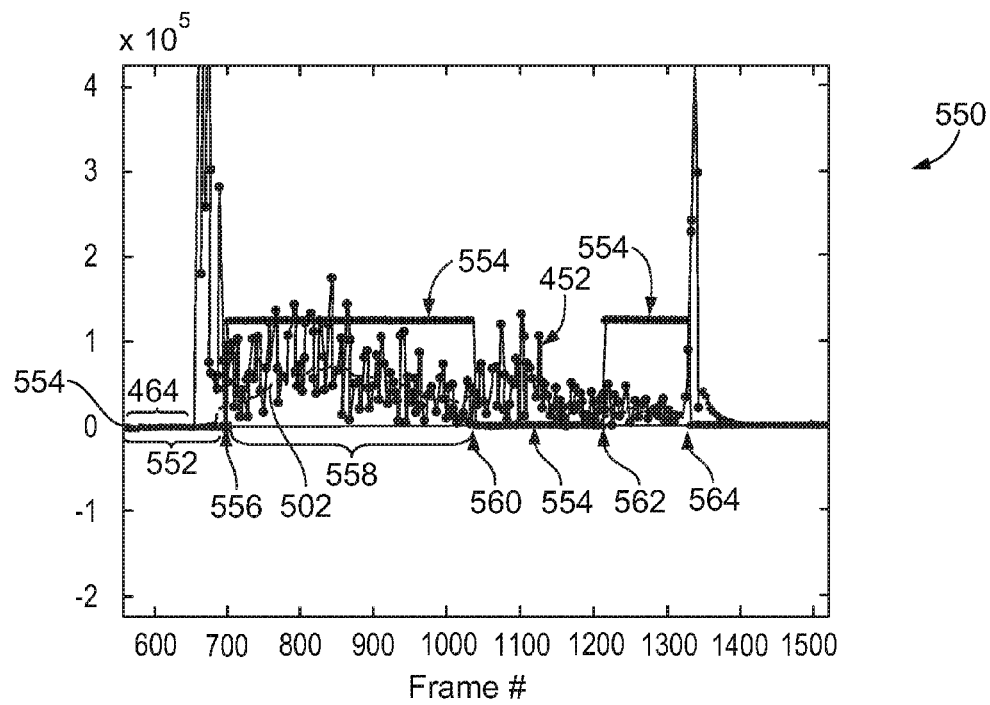
FIG. 11 illustrates a graph showing results of a ratio comparison of the fast averaged envelope to the background activity in accordance with an embodiment of the present invention.

FIG. 11 illustrates a graph 550 showing the results of a ratio comparison of the fast averaged envelope 502 to the background activity 464. During frames 552, the ratio of the fast averaged envelope 502 to the background activity 464 is less than a predetermined amount, such as less than ten. Therefore, line 554 that indicates the hold condition or event is held low. The line 554 may also be referred to as a flag that is turned on or pulled high to indicate that a hold condition is occurring and turned off or pulled low to indicate that a hold condition is not occurring. At frame 556, the ratio of (fast envelope/background) is at least ten, and the line 554 is pulled high, indicating that a hold condition or event is occurring. The hold event extends for frames 558, corresponding to the hold 468 shown in FIG. 10. At frame 560 the line 554 is pulled low, as the fast averaged envelope 502 is held to the level of the background activity 464 as shown during zeroed period 524 of FIG. 10. At frame 562 the line 554 is again pulled high when the ratio of the fast averaged envelope 502 to the background activity 464 meets the predetermined threshold during the hold 570. Then, at frame 564 the line 554 is pulled low when the lift-off 458 is detected. The line 554 remains low as the ratio of (fast envelope/background) does not meet the predetermined threshold.

In some conditions, when the background activity 464 is very low, the time for the ratio of the fast averaged envelope 502 to the background activity 464 to drop below ten or another predetermined threshold may exceed the actual hold event or cause a hold event to be erroneously indicated. This may occur after a single tap, for example, in a very quiet environment or due to the continuing of the vibrations on the substrate 208. The extension of the hold condition may also occur when the acoustic coordinate determination and touch activity detection module 130 does not detect the lift-off event. In some cases, the lift-off will not result in a match with a stored acoustic fingerprint, or the identification of an (X,Y) location, and thus the LF energy greatly increases but the hold detection module 132 does not pull the fast averaged envelope 502 to zero or to the level of the background activity 464.

Returning to FIG. 6, at block 328 the processor module 128 may calculate the slow averaged envelope to ensure that unacceptable termination delays do not occur. The slow averaged envelope has a higher smoothing coefficient than the fast averaged envelope 502. The slow averaged envelope may be calculated using an IIR filter that has a single smoothing coefficient $\alpha$ with the value of 0.99. The high level of smoothing prevents the slow averaged envelope from being overly contaminated by touch events. In comparison with fast averaged envelope 502, the slow averaged envelope is not set to the level of the background activity 464. Also, because the slow averaged envelope decays slower than fast averaged envelope 502, after a lift-off event the ratio of the two envelopes (slow envelope/fast envelope) increases rapidly at the point of termination.

In one embodiment, the hold detection module 132 determines that a hold event is active when the ratio (fast envelope/background) is greater than a first predetermined threshold and the ratio (slow envelope/fast envelope) is less than a second predetermined threshold. For example, the first predetermined threshold may be met when (fast envelope/background) is greater than ten and the second predetermined threshold may be met when (slow envelope/fast envelope) is less than ten. In other embodiments, different numbers may be used for the predetermined thresholds. In another embodiment, the hold detection module 132 may use one ratio, such as either (fast envelope/background) or (slow envelope/fast envelope), to determine that a hold condition is occurring.

Figure 12:
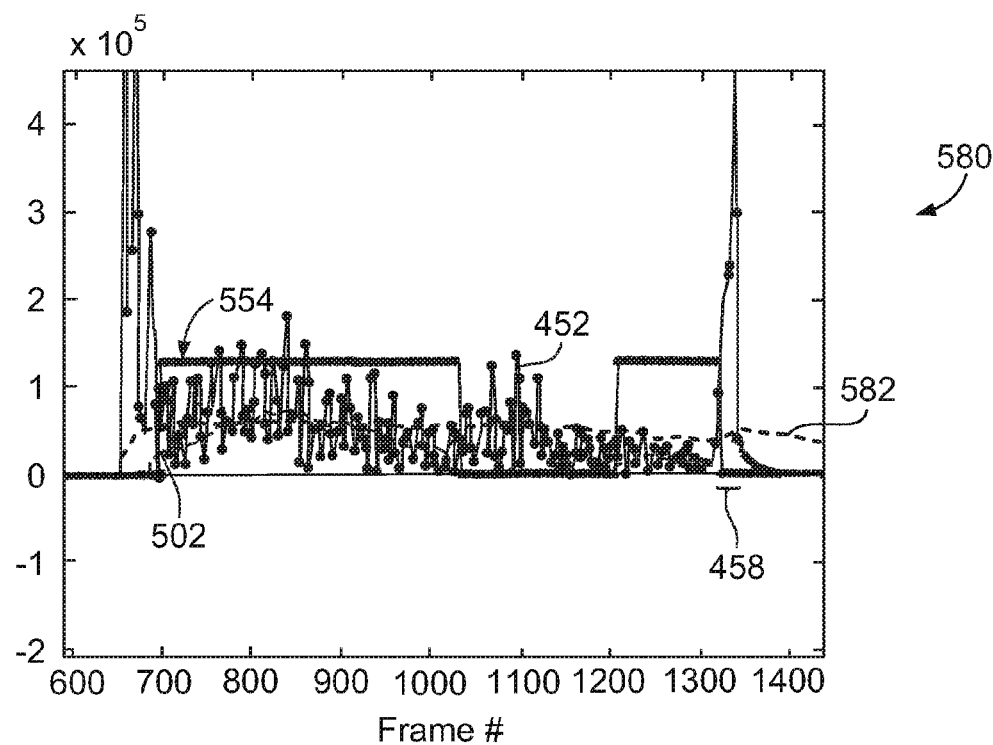
FIG. 12 illustrates a graph that shows a line indicating whether a hold condition is detected based on the ratio of the fast envelope to the background activity in accordance with an embodiment of the present invention.

FIG. 12 illustrates a graph 580 that shows the line 554 indicating whether a hold condition is detected based on the ratio of (fast envelope/background), the fast averaged envelope 502 and slow averaged envelope 582. The graph 580 includes the same events as FIGS. 7-9, wherein the sequence of touch events, although not indicated on graph 580, is tap 454, hold 468, drag 456, hold 470 and lift-off 458. In this example, the acoustic coordinate determination and touch activity detection module 130 correctly detects the touch events of tap 454, drag 456 and lift-off 458. The slow averaged envelope 582, which is the slow average of the decimated signal 452, remains relatively constant throughout the event sequence. Therefore, the hold detection module 132 correctly identifies the holds 468 and 470, and does not detect a hold condition after the lift-off 458.

The use of the ratio of (slow envelope/fast envelope) may be useful when a single tap has occurred. In some cases the ratio of (fast envelope/background) may falsely indicate that a hold event is occurring due to the decaying but still present vibrations on the substrate 208 after the object has left the substrate 208. The slow averaged envelope 582 remains at a relatively high level after the touch is no longer detected, and thus the condition of the ratio of (slow envelope/fast envelope) being greater than ten is met. Thus, there is no need to wait until the fast envelope is less than ten times that background level to confidently reject a hold interpretation of the signals.

Figure 13:
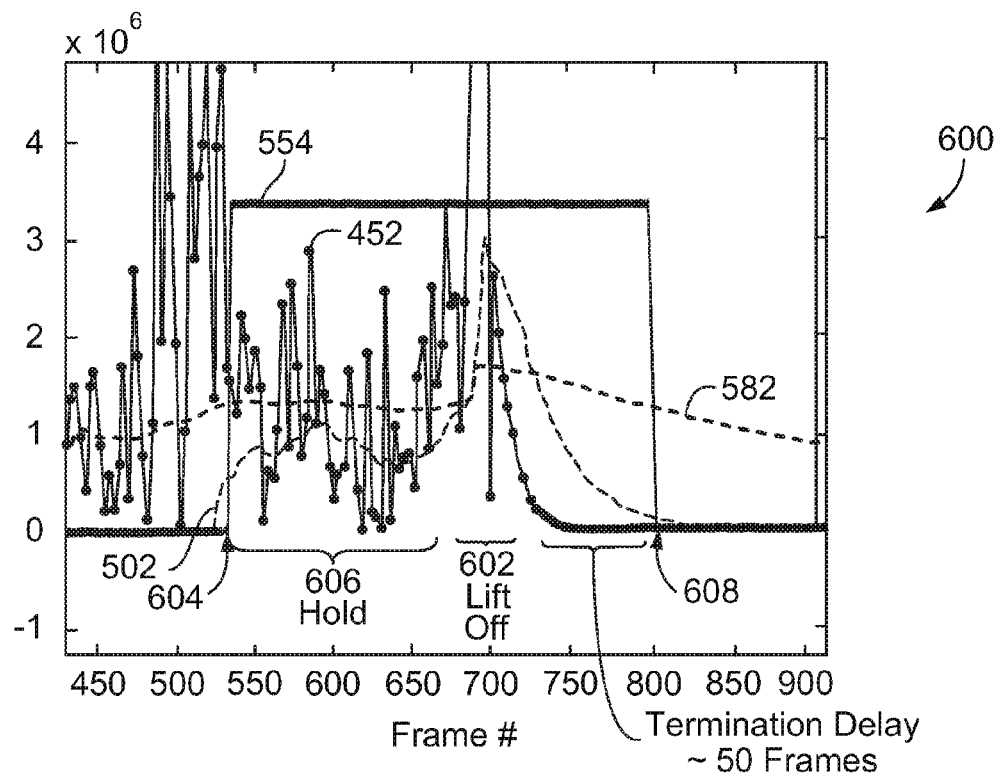
FIG. 13 illustrates a graph that shows a lift-off that is not detected based on high frequency components, resulting in a hold that is not properly terminated in accordance with an embodiment of the present invention.

In certain cases, it may be advantageous to detect lift-off events that do not generate coordinates by using pVar 166 and/or peaks in the decimated signal 452. Here a decimated signal peak is defined to occur when the ratio of the decimated signal to the slow envelope exceeds a threshold such as five. FIG. 13 illustrates the need for such an additional lift-off detection method. FIG. 13 illustrates a graph 600 that shows a lift-off 602 that is not detected by the acoustic coordinate determination and touch activity detection module 130. As discussed above, the acoustic coordinate determination and touch activity detection module 130 may not always detect the lift-off event as a touch event, even though significant HF energy is generated. The slow averaged envelope 582 is indicated, as well as the fast averaged envelope 502 and the line 554 that indicates, based on the ratio (fast envelope/background), when hold 606 is occurring. Because the acoustic coordinate determination and touch activity detection module 130 does not detect the lift-off 602, the hold detection module 132 does not pull the fast averaged envelope 502 to ground or to the level of background activity 464 during the lift-off 602 or during the blackout period following the lift-off 602. If the hold detection module 132 uses only the ratio (fast envelope/background) to determine the hold 606, the hold 606 would be indicated from frame 604 until frame 608, thus undesirably extending through and after the lift-off 602. Furthermore, even if the hold detection module 132 also uses the condition of the ratio (slow envelope/fast envelope) to be less than a predetermined threshold such as ten, the fast averaged envelope 502 still may require 50 frames or about 0.3 seconds after the lift-off 602 to become a factor of ten less that the slow averaged envelope 582 which remains relatively constant in amplitude. For example, during an unrecognized lift-off event, large decimated signal values greatly increase the fast envelope value, giving it a long way to fall before becoming a factor of ten less than the slow envelope. In some embodiments, 0.3 seconds of response time may result in problems for some touch applications. In at least one embodiment, the very large values of the decimated signal 452 during lift-off may be used to resolve the slow response time.

A peak in the decimated signal 452 may be defined as a frame for which the decimated signal 452 whose ratio with respect to the slow envelope exceeds a threshold. For example, a decimated signal greater than ten times the corresponding slow average may be defined as a decimated signal peak. A lift-off event may be implied even if no touch activity is detected in module 130 by the presence and there is a decimated signal peak. This decimation signal peak method may be used alone to flag lift-off events or in combination with the pVar methods discussed below.

As discussed above with respect to FIG. 1, although the HF components or signal information may not result in a detected touch event providing measured (X,Y) coordinates, other measures of touch activity besides (X,Y) coordinates, such as the phase variance pVar 166 may be acceptable. The pVar 166 may be calculated as part of the algorithm within the acoustic coordinate determination and touch activity detection module 130. The pVar 166 may be calculated for every frame, and a low pVar 166 value may indicate a touch event.

When the value of pVar 166 is below a predetermined threshold, a third ratio may be used to determine whether a lift-off has occurred. In order to determine whether LF peaks correspond to a lift-off event, the LF input signal at the current frame is compared to the slow averaged envelope from two frames earlier. If the ratio is greater than a predetermined threshold and the pVar condition is met, a lift-off is assumed. In one embodiment, the predetermined threshold or predetermined condition for the ratio of (LF/slow envelope) is five. In another embodiment, a lift-off may be detected if the ratio of (LF/slow envelope) is greater than ten even if the pVar condition is not met. In addition, a blackout period of a predetermined number of frames may be set after the lift-off is detected. In one embodiment, the blackout period is set for twenty decimated frames. Therefore, the fast averaged envelope 502 is pulled to the level of the background activity 464 when the above conditions are met, and held at the level of the background activity 464 for twenty frames.

Figure 14:
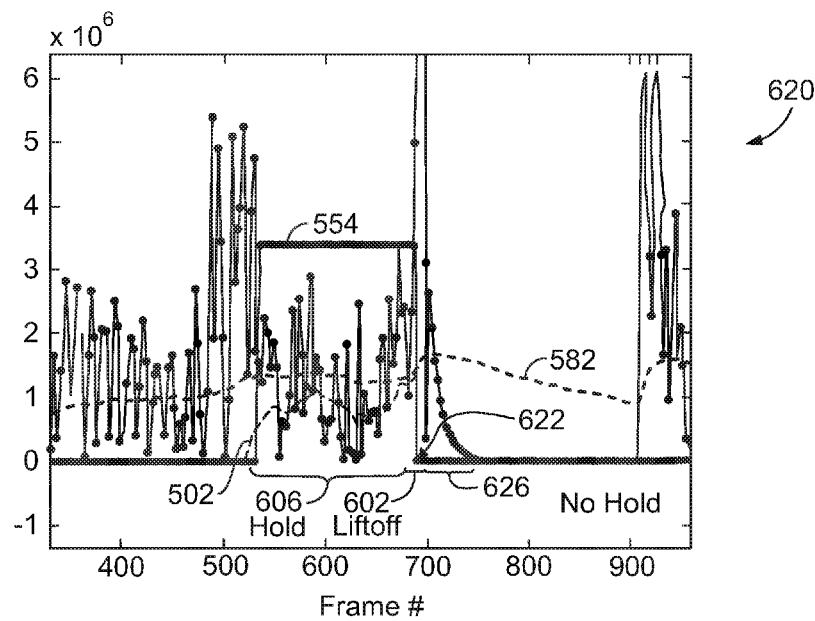
FIG. 14 illustrates a graph wherein phase variance and decimated signal peak detection is used to identify a lift-off in accordance with an embodiment of the present invention.

FIG. 14 illustrates a graph 620 wherein pVar 166, in addition to a decimated signal peak, is used to identify the lift-off 602. For example, the level of pVar 166 calculated by the acoustic coordinate determination and touch activity detection module 130 may indicate that conditions have been met that indicate a lift-off has occurred, even though the acoustic coordinate determination and touch activity detection module 130 is unable to match the signals, for example, with a template fingerprint 140-144 within the calibration file 138. Based on the pVar 166 (and the detection of a decimated signal peak), the line 554 may be pulled low at frame 622 as soon as the lift-off 602 is identified. Blackout period 626 follows the frame 622, and may, in some embodiments, be twenty decimated frames or about 120 milliseconds. In other embodiments different numbers of decimated frames may be used. Therefore, the hold 606 is properly terminated.

In one embodiment, a hold may be prematurely terminated due to fluctuations in one or more of the fast averaged envelope 502, the slow averaged envelope 582 and the background activity 464. Therefore, when the hold parameters are no longer being met after a hold condition is detected, a delay period may be used. For example, the hold detection module 132 may continue the hold condition for a delay period. In one embodiment, the delay period may be fifteen decimated frames, which may correspond to about 90 milliseconds. If the hold is again detected within the delay period, the hold condition is determined to be active. If the hold is not detected within the delay period, the hold detection module 132 may determine that the hold has been terminated so that no further hold conditions are allowed until after touch activity is again detected. This allows the system 100 to compensate for minor signal disruptions, while still responding timely to the changes the user is making.

The discussion above considers the case wherein a single touch occurs at a time. However, the methods and apparatus discussed above are also applicable to bending wave touch systems that support multiple touch operation in which more than one touch may be present at any given instant of time. For example, the above described hold detection systems and methods may be used to distinguish between the absence of any touches on the touch substrate and the presence of one or more fingers or objects held on the substrate.

In some cases, additional processing particular to multiple touch cases may be used. As an example, a first touch may make contact with a touch surface, resulting in a correct coordinate determination, and then the touch may be held on the touch surface. While the first touch is held, resulting in no new coordinates, a second touch may make contact with the touch surface resulting in a correct coordinate determination. The second touch may also be held on the touch surface. At this point, the coordinates of both held touches are known. Now one of the touches is removed. If the lift-off generates sufficient signal for a coordinate determination, then by elimination the coordinates of the remaining held touch are known. However, if the lift-off generations a touch activity signal (e.g. pVar drops below a threshold) without generating (X,Y) coordinates, the location of the remaining finger is potentially ambiguous between the coordinates of the first and second touches.

Figure 15:
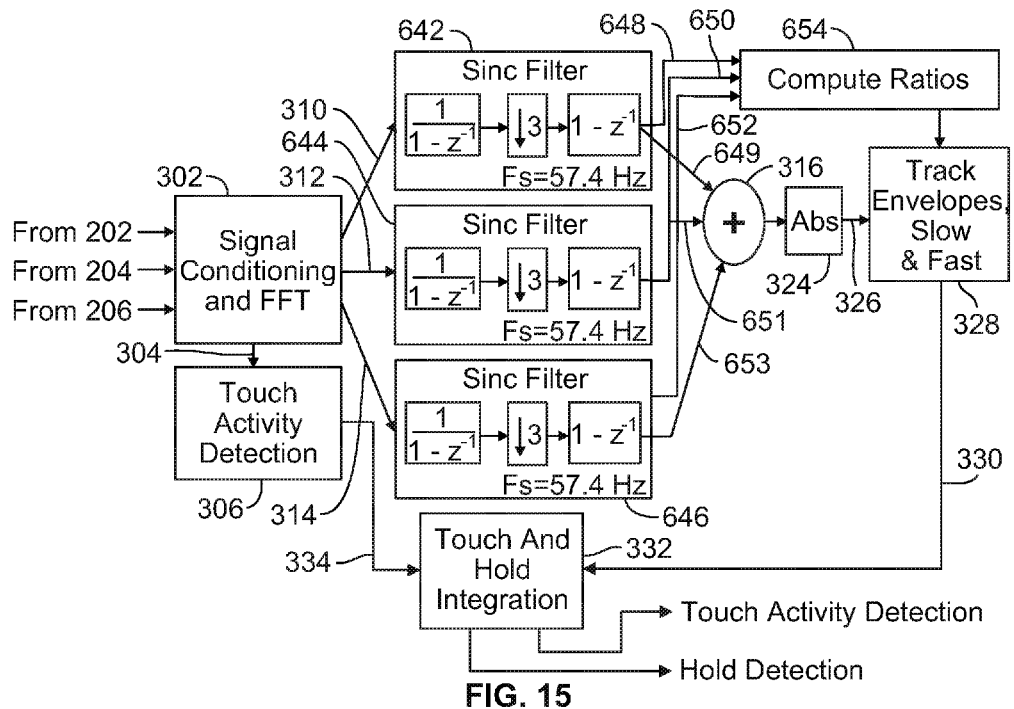
FIG. 15 illustrates a block diagram for computing ratios of low frequency signal components to identify coordinates of a remaining touch in accordance with an embodiment of the present invention after multiple touches have been held simultaneously on the touch surface.

FIG. 15 illustrates a block diagram 640 for computing ratios of LF signal components from sensors on a touch panel to identify coordinates of a remaining touch after multiple touches have been held simultaneously on the touch surface. The block diagram 640 is a modified version of the block diagram 300 of FIG. 6 in which similar components have been given like item numbers. Three Sinc filters 642, 644 and 646 receive the LF components on lines 310, 312 and 314, respectively, and output low-pass filtered and decimated signals (before absolute value) on lines 648, 650 and 652 to block 654 and on lines 649, 651 and 653 to the summing circuit 316. In comparison with FIG. 6, the summing circuit 316 is positioned after the Sinc filters 642, 644 and 646. Because the Sinc filters 320, 642, 644 and 646 are linear devices, the absolute value block 324 receives the same summed signal in FIG. 15 as was received in FIG. 6. In the configuration of FIG. 15, the three outputs on lines 648, 650 and 652 from the three Sinc filters 642, 644 and 646, which may correspond to the three sensors 202, 204 and 206 of FIG. 3, are now available for further processing. In particular, the block 654 may compute ratios of piezo or sensor signal LF components.

Assuming a single hold, wherein one object touches the substrate 208 in one location, the ratios vary depending on the location of (X,Y) coordinates of the touch, and thus the computed ratios may enable a general measure of touch location. This general measurement of touch location of a single hold may enable resolution of the ambiguity described in the previous paragraph. For example, if the ratios of LF signals from the sensors 202, 204 and 206 are consistent with the second touch location and inconsistent with the first touch location, the system may determine that the first touch has lifted and the second touch remains held.

In some embodiments, more than one type of wave or signal may be used within a single touch detection system. For example, bending waves may be detected and used for LF signal processing while surface acoustic waves may be detected and used for the HF touch detection processing. In one embodiment, the ability of the LF system to detect a contact condition, wherein the object is held against the surface, may be used as a wake-up condition for a SAW touchscreen. Therefore, the application of the above discussed method and apparatus for detecting contact conditions need not be limited to bending-wave touchscreen systems, but may also be of use in the detection of touch activity or contact conditions for other types of touchscreens.

Figure 16:
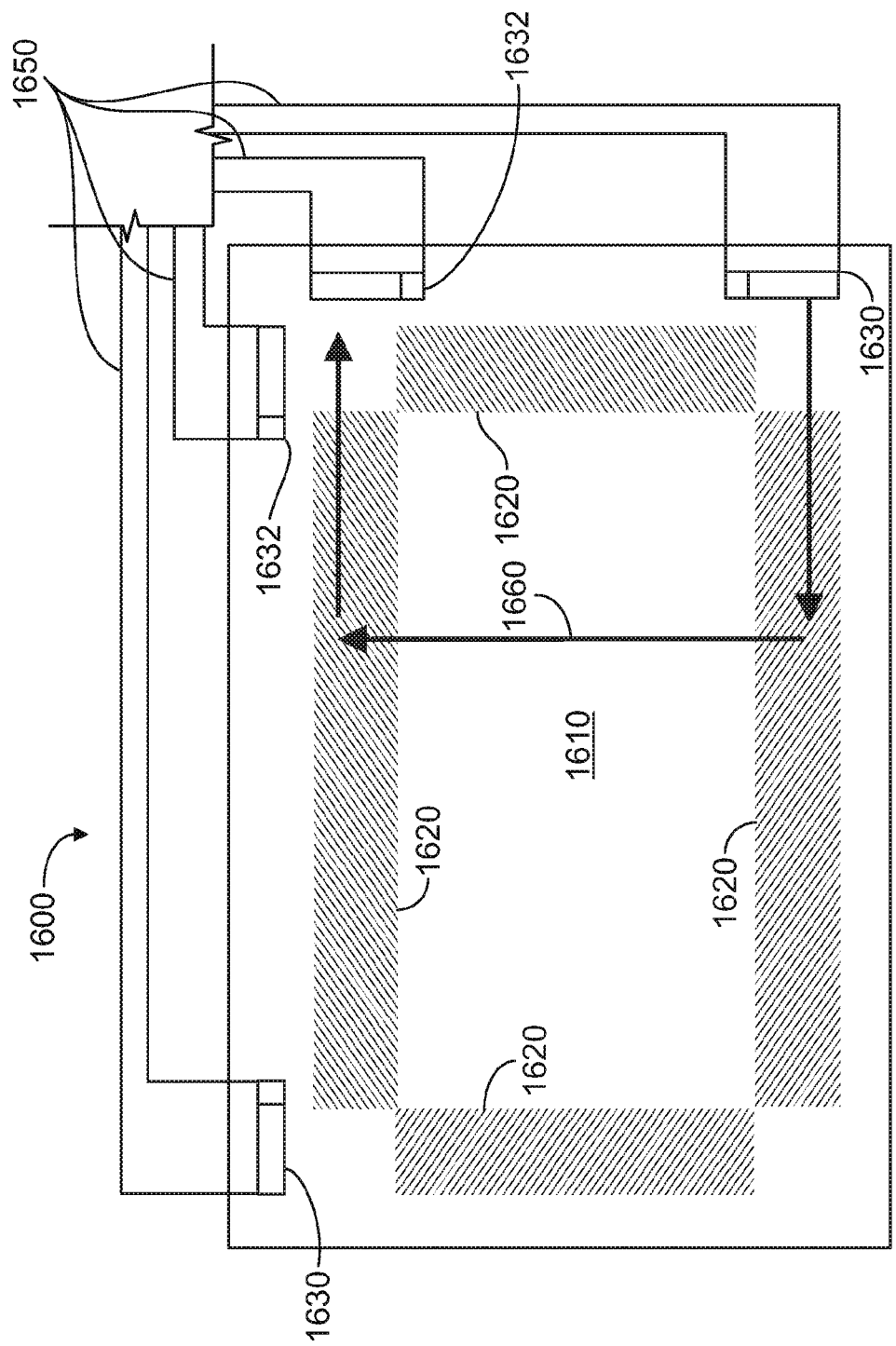
FIG. 16 illustrates a surface acoustic wave touchscreen that may be used to detect LF signal components in accordance with an embodiment of the present invention.

FIG. 16 illustrates a surface acoustic wave touchscreen 1600 that may be used to detect LF signal components. Touchscreen 1600 comprises a glass substrate 1610 having a top surface with a touch area surrounded by four arrays 1620 comprised of 45 degree reflector elements which define surface acoustic wave paths such as path 1660 between transmitting transducers 1630 and receiving transducers 1632. In conventional designs, transmitting transducers 1630 and receiving transducers 1632 contain piezoelectric sensors such as PZT piezos. Because the desired surface acoustic waves of touchscreens have operating frequencies in the MegaHertz range, conventional electronics rejects LF signals in the audio and sub-audio range generated by transducers 1630 and 1632.

However, electronics of a surface acoustic wave touchscreen system may be modified to detect and process the LF piezo signals so as to recognize hold and touch activity conditions. Such hold/touch-activity circuitry may be designed to consume power at a much lower rate than an active surface acoustic wave touch system. With no change to the design of the surface acoustic wave touchscreen 1600 and modest changes to associated electronics, a low power hold/touch-activity detection sub-circuit (not shown) but similar to the circuitry discussed herein, may conditionally wake-up or activate the surface acoustic wave touch system only during periods of touch activity, thus providing power savings.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. This written description uses examples to disclose the invention, including the best mode, and also to enable any person skilled in the art to practice the invention, including making and using any devices or systems and performing any incorporated methods. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A bending wave touch system, comprising:
    at least one sensor coupled to a substrate and responsive to vibrations in the substrate, the at least one sensor outputting signals; and
    a controller configured to receive the signals from the at least one sensor, the controller further configured to identify touch coordinates based on high frequency components of the signals when a touch on the substrate comprises at least one of a tap, a drag and a lift-off, the controller further configured to identify a status of a hold condition of the touch based on at least two different time averages of low frequency components of the signals.

2. The system of claim 1, further comprising a frequency transform module configured to accomplish fast Fourier transformation (FFT) on the signals, and wherein the low frequency components are based on FFT Bin 0.

3. The system of claim 1, further comprising a frequency transform module to receive the signals from the at least one sensor, the frequency transform module including high and low pass filters to output the high and low frequency components over a high frequency channel and a low frequency channel, respectively, to the controller.

4. The system of claim 1, further comprising a signal processing circuit configured to process the signals and output a non-monotonic frequency response.

5. The system of claim 1, wherein the two different time averages comprise a fast averaged envelope and a slow averaged envelope, the system further comprising a hold detection module configured to calculate absolute values of the low frequency components and to calculate the fast averaged envelope and the slow averaged envelope wherein the absolute values are averaged over relatively shorter and relatively longer periods of time, respectively.

6. The system of claim 1, wherein the two different time averages comprise a fast averaged envelope and a slow averaged envelope, the system further comprising a hold detection module configured to calculate the slow averaged envelope based on the low frequency components, the hold detection module further configured to hold the slow averaged envelope to a level of background activity when the at least one of the tap, the drag and the lift-off are identified.

7. The system of claim 1, wherein the controller is further configured to prevent the hold condition when the hold condition is identified without at least one of the tap and the drag being detected prior to the hold condition.

8. A method for identifying a hold condition on a bending wave touch panel, comprising:
    detecting signals with at least one sensor bonded with a substrate, the signals indicative of vibrations on the substrate of a bending wave touch panel;
    identifying at least one of a tap and a drag based on the signals;
    calculating two different time averages based on low frequency components of the signals; and
    identifying a hold condition following the at least one of the tap and the drag based on amplitude levels of the two different time averages.

9. The method of claim 8, further comprising fast Fourier transforming (FFT) the signals, wherein the low frequency components are based on FFT Bin 0.

10. The method of claim 8, further comprising:
    low pass filtering the low frequency components to pass frequency components below 100 Hz; decimating the frequency components below 100 Hz; and
    forming an envelope based on absolute values of the frequency components, the envelope comprising one of the two different time averages, the identifying the hold condition being further based on the envelope.

11. The method of claim 8, further comprising:
    low pass filtering the low frequency components to pass frequency components below 100 Hz;
    forming a fast averaged envelope based on the low frequency components wherein an absolute value of the low frequency components is quickly averaged over time; and
    forming a slow averaged envelope wherein the absolute value of the low frequency components are slowly averaged over time, wherein the fast and slow averaged envelopes comprise the two different time averages, and wherein the hold condition is identified when a ratio of the slow averaged envelope to the fast averaged envelope is less than a predetermined threshold.

12. The method of claim 8, further comprising:
    determining an average background activity when no touch is present on the substrate;
    forming a fast averaged envelope based on the low frequency components wherein absolute values of the low frequency components are quickly averaged over time; and
    forming a slow averaged envelope based on the low frequency components wherein the absolute values of the low frequency components are slowly averaged over time, wherein the fast and slow averaged envelopes comprise the two different time averages, wherein the hold condition is identified when a ratio of the slow averaged envelope to the fast averaged envelope is less than a predetermined threshold and a ratio of the fast averaged envelope to the background activity is greater than a second predetermined threshold.

13. The method of claim 8, further comprising:
    low pass filtering the low frequency components to pass frequency components below 100 Hz;
    decimating the frequency components below 100 Hz; and
    detecting a lift-off when a ratio of the decimated frequency components to an envelope based on absolute values of the decimated frequency components exceeds a predetermined threshold, the envelope comprising one of the two different time averages.

14. The method of claim 8, further comprising detecting a lift-off event when the low frequency components comprise at least a predetermined signal amplitude and a phase variance of the signals is less than a predetermined threshold.

15. The method of claim 8, further comprising setting the low frequency components to one of zero and a level based on a background activity for a predetermined period of time after the tap or a lift-off is detected, and wherein the background activity is based on signals received when no touch is present on the substrate.

16. The method of claim 8, further comprising:
 holding the hold condition for a predetermined delay period; and
 terminating the hold condition if the hold condition is not valid after the delay period.

17. A method for determining touch coordinates on a bending wave touch surface, comprising:
 detecting signals with at least two sensors bonded with the bending wave touch surface, the signals indicative of vibrations on the bending wave touch surface;
 low pass filtering the signals to pass low frequency components below 100 Hz; and
 determining the touch coordinates of a single touch on the touch surface based on ratios of the low frequency components; wherein at least one of the ratios is determined based on at least one averaged envelope of the low frequency components.

18. The method of claim 17, wherein the single touch condition is determined when a phase variance of the signals is less than a predetermined threshold.

19. The method of claim 17, wherein the low pass filtering further comprising separately low pass filtering the signals from different ones of at least two sensors, and wherein the touch coordinates of the single touch are further determined based on ratios of low frequency components associated with the at least two sensors.

20. The method of claim 17, further comprising: determining touch coordinates of at least two touches held simultaneously on the bending wave touch surface such that the touch coordinates of a single touch remaining on the touch surface is based on the ratios of the low frequency components.

* * * * *